(12) United States Patent
Allebach et al.

(10) Patent No.: US 6,791,718 B1
(45) Date of Patent: Sep. 14, 2004

(54) HALFTONE PRINTING WITH DITHER MATRICES GENERATED BY USING CLUSTER FILTERS

(75) Inventors: Jan P. Allebach, Lafayette, IN (US); Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 883 days.

(21) Appl. No.: 09/594,200

(22) Filed: Jun. 14, 2000

(51) Int. Cl.$^7$ .............................................. H04N 1/405
(52) U.S. Cl. ..................... 358/3.13; 358/3.17; 358/534; 382/237
(58) Field of Search ................................ 358/534, 535, 358/536, 3.13, 3.14, 3.15, 3.16, 3.17, 3.18, 3.19; 382/232, 237

(56) References Cited

U.S. PATENT DOCUMENTS

| | | | | |
|---|---|---|---|---|
| 4,920,501 A | * | 4/1990 | Sullivan et al. ............ | 358/3.19 |
| 5,317,418 A | * | 5/1994 | Lin ........................... | 358/3.04 |
| 5,526,438 A | * | 6/1996 | Barton ....................... | 382/237 |
| 5,754,311 A | * | 5/1998 | Ray ........................... | 358/3.14 |
| 5,761,325 A | * | 6/1998 | Barton ....................... | 382/100 |

OTHER PUBLICATIONS

Thomas M. Holladay, "An Optimum Algorithm for Halftone Generation for Displays and Hard Copies," published in the Proceedings of the SID, vol. 21/2, 1980.

Issac Amidror, Roger D. Hersch, and Victor Ostromoukhov, "Spectral Analysis and Minimization of Moiré Patterns in Color Separation," published in the Journal of Electronic Imaging, vol. 3(3), Jul. 1994.

Robert Ulichney, "The Void–and–Cluster Method for Dither Array Generation," published in SPIE/IS&T Symposium on Electronic Imaging Science and Technology, San Jose, Calif., 1993.

Fredrik Nilsson, "Digital Halftoning using Pre–Computed Maps," Journal of Imaging Science and Technology, vol. 43, No. 2, Mar./Apr. 1999, pp. 153–159.

* cited by examiner

Primary Examiner—Thomas D. Lee (57) ABSTRACT

A method and system for generating dither matrices for halftone printing. The design of the dither matrices involves modifying a human visual system model cost function to be color-blind and the addition of a cluster cost function. The cluster fluctuation function has a clustering factor for specify the clustering effect in the halftone image. The clustering factor is preferably gray-level dependent and may be implemented with a look-up table that specifies a clustering factor for each specific gray level. The cluster fluctuation function may optionally include a structure suppression term for suppressing the formation of long horizontal structures or long vertical structures. The structure suppression term includes a symmetry factor for specifying the symmetry of the cluster cost function. The symmetry factor is preferably gray-level dependent and may be implemented with a look-up table that specifies a symmetry factor for each specific gray level.

23 Claims, 8 Drawing Sheets

HALFTONE PRINTING WITH DITHER MATRICES GENERATED BY USING CLUSTER FILTERS

FIELD OF THE INVENTION

The present invention relates generally to halftone images, and more particularly, to methods for generating dither matrices for use in printing halftone images by utilizing cluster filters.

BACKGROUND OF THE INVENTION

Electro-photographic (EP) printers generally do not render single dots well. When attempting to print a single dot, EP prints may print a very light dot or no dot at all. Moreover, in a single dot system, neighboring dots interact in the EP development process, thereby injecting difficulties in this design process. Accordingly, the default halftone for most EP printers is a regular clustered-dot halftone. "An Optimum Algorithm for Halftone Generation for Displays and Hard Copies," written by Thomas M. Holladay, and published in the Proceedings of the SID, Vol. 21/2, 1980, generally describes an exemplary clustered-dot approach. Unfortunately, the halftone images that are rendered by using dither matrices designed by the regular clustered-dot process suffer from moire problems, especially when the original image contains a periodic structure. A general discussion of moire problems can be found in "Spectral Analysis and Minimization of Moiré Patterns in Color Separation," written by Issac Amidror, Roger D. Hersch, and Victor Ostromoukhov, and published in the Journal of Electronic Imaging, Vol. 3(3), July 1994.

In addition, halftone images may be rendered by using dither matrices designed by the stochastic halftone process feature dots with maximum dot dispersion. This approach is also known as the void-and-cluster method. A general discussion of the void-and-cluster method can be found in "The Void-and-Cluster Method for Dither Array Generation," written by Robert Ulichney, and published in SPIE/IS&T Symposium on Electronic Imaging Science and Technology, San Jose, Calif., 1993.

Unfortunately, this maximum dot dispersion approach is undesirable since it generally causes the halftone image to be unstable (e.g., noisy), reproduce poorly, and often have an unacceptable level of dot gain. The halftone pattern reproduces poorly due to a steep tone curve that causes calibration problems. An unacceptable level of dot gain refers to printed dots that are bigger than the printing grid, thereby undesirably causing adjacent dots to overlap.

Based on the foregoing, it is desirable to provide a method for generating stochastic clustered-dot dither matrices for use in halftone printing. In particular, it is desirable to provide a method for generating stochastic clustered-dot dither matrices by utilizing an additional cluster cost function to encourage clustering of the dots in the halftone image.

SUMMARY OF THE INVENTION

The present invention provides a method for generating stochastic clustered-dot dither matrices for use in halftone printing. The stochastic clustered-dot dither matrices produced by the present invention may be utilized to generate halftone images that feature clustered dots.

According to the present invention, a design technique for generating dither matrices for halftone printing is provided. This technique generates dither matrices by using a total cost function that incorporates a modified human visual system model cost function and a cluster cost function. A human visual system model cost function is received and modified so that the cluster sizes of the primary colors are the same (e.g., by modifying the human visual system model cost function to be color-blind). A cluster cost function for generating clustered dots is added to the human visual system model cost function to arrive at the total cost function. The total cost function includes a clustering factor for specifying the amount of clustering effect in the halftone image. Preferably, the clustering factor is gray-level dependent and may be implemented with a look-up table that specifies a dispersion distance between dots for each specific gray level.

In an alternative embodiment, the cluster cost function may include a structure suppression term for suppressing the formation of long horizontal structures or long vertical structures. The structure suppression term includes a symmetry factor for, controlling the symmetry properties related to the cluster cost function. Preferably, the symmetry factor is gray-level dependent and may be implemented with a look-up table that specifies a symmetry factor for each specific gray level.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE PREFERRED EMBODIMENT

A method for designing color dither matrices by using a cluster filter is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Dither Matrix Design System 10

Figure 1:
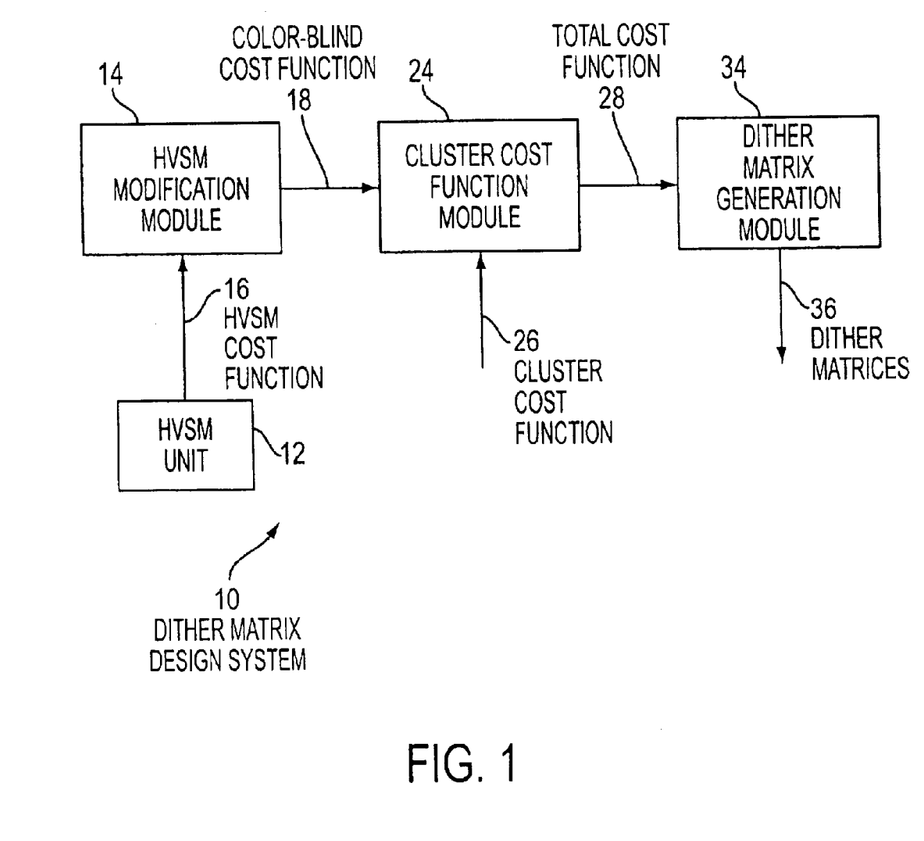
FIG. 1 is a block diagram of a dither matrix design system configured in accordance with one embodiment of the present invention.

FIG. 1 is a block diagram of a dither matrix design system 10 configured in accordance with one embodiment of the present invention. The dither matrix design system 10 includes a human visual system model unit (HVSM) 12. The HVSM 12 unit provides one or more mathematical functions that model the behavior of the human visual system. These HVSMs are well known and consequently, are not described further herein. A HVSM modification module 14 is coupled to the HVSM unit 12 for receiving a human visual system model cost function (HVSMCF) 16 and based thereon for generating a color blind cost function 18.

The dither matrix design system 10 also includes a cluster cost function module 24 coupled to the HVSM modification module 14 for receiving the color blind cost function 18 and adding a cluster cost function 26 thereto to generate a total cost function 28. A dither matrix generation module 34 is coupled to the cluster cost function module 24 for receiving the total cost function 28, and based thereon for generating dither matrices 36.

The dither matrix design system 10 of the present invention can be embodied on a media that is incorporated in a processor-based system (e.g., a personal computer or workstation). In the currently preferred embodiment, the present invention is related to the use of computer system to implement a software application that generates color dither matrices for use in halftone printing. It is noted that the present invention can be implemented in software, hardware, firmware, or a combination thereof.

Once designed, the color dither matrices can be embodied on a media that is incorporated in office equipment (e.g., printer, all-in-one machine, digital copier, computer, etc.) or separate from office equipment. When incorporated in office equipment, the media, having the dither matrices designed by the present invention embodied therein, can be in the form of a memory (e.g., random access memory (RAM), read only memory (ROM), etc.). When incorporated separate from the office equipment, the media, having the dither matrices designed by the present invention embodied therein, can be in the form of a computer-readable medium, such as a floppy disk, compact disc (CD), etc. The color dither matrices are preferably stored in printer driver or a memory accessible by a print engine for use in the halftoning process.

The process of designing these color dither matrices by utilizing a cluster filter shall now be described in greater detail.

OVERVIEW OF DITHER MATRIX DESIGN

The dither matrix design technique employed by the present invention shall be explained with reference to color dither matrices for use in a cyan, magenta, yellow, and black (CMYK) color space based printing system. However, it is noted that the techniques described herein below are equally applicable to the design of dither matrices for other printing systems. Also, it can be appreciated that the techniques described herein are not limited to the CMYK color space, but can be extended to other color spaces (e.g., RGB or CMY). The present invention is also applicable to display systems (e.g., RGB monitors) that use halftoning to display monochrome or RGB images.

In general, the design technique of the present invention generates dither matrices by using a total cost function that incorporates a modified human visual system model cost function and a cluster cost function. First, a human visual system model (HVSM) cost function is received and modified so that the HVSM cost function so that the cluster sizes for the different primary colors are uniform (i.e., the cluster sizes are the same). One way to ensure uniform cluster sizes across color channels is to modify the HVSM cost function so that it is colorblind. Second, a cluster cost function is added to the modified HVSM cost function to generate a total cost function. The total cost function includes a cluster factor for specifying the dispersion distance between dots in the halftone image. The cluster factor is preferably gray-level dependent and may be implemented as a look-up table that specifies a cluster factor for each gray-level.

The cluster cost function optionally includes a suppression term for suppressing the formation of long horizontal structures and vertical structures. The suppression term includes a symmetry factor for specifying the symmetry of the cluster cost function. The symmetry factor is preferably gray-level dependent and may be implemented as a look-up table that specifies a cluster factor for each gray-level.

For a further description of this process (which is also referred to as a ColorSmooth dither matrix design process), please refer to U.S. Pat. No. 5,812,744 entitled, "Joint Design of Dither Matrices for A Set of Colorants," Jan P. Allebach and Qian Lin, which is incorporated herein by reference.

OVERVIEW OF COLOR SMOOTH DITHER MATRIX DESIGN

Figure 2:
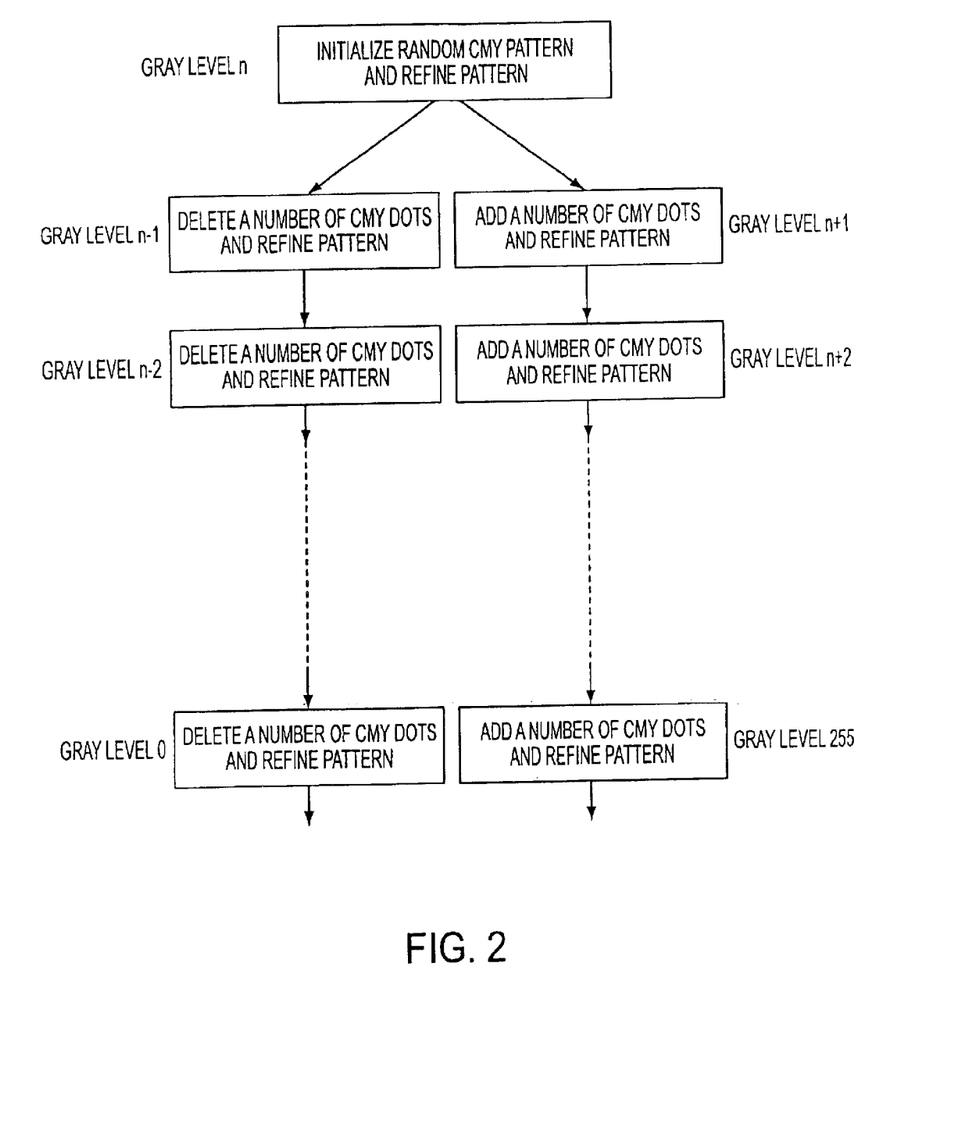
FIG. 2 is a flow chart illustrating the dither matrix design process.
Figure 3:
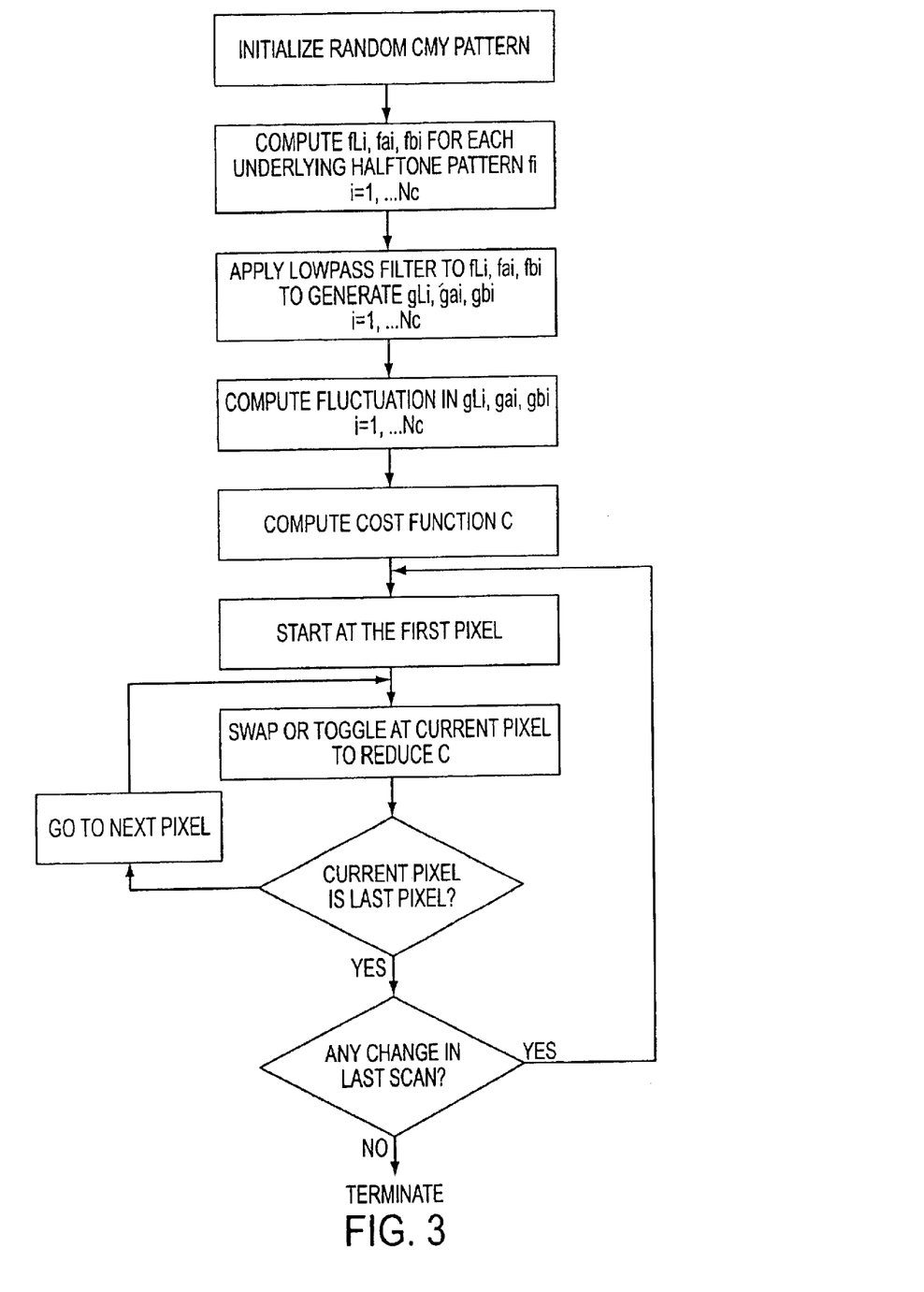
FIG. 3 is a flow chart illustrating the steps for refining a halftone pattern.
Figure 4:
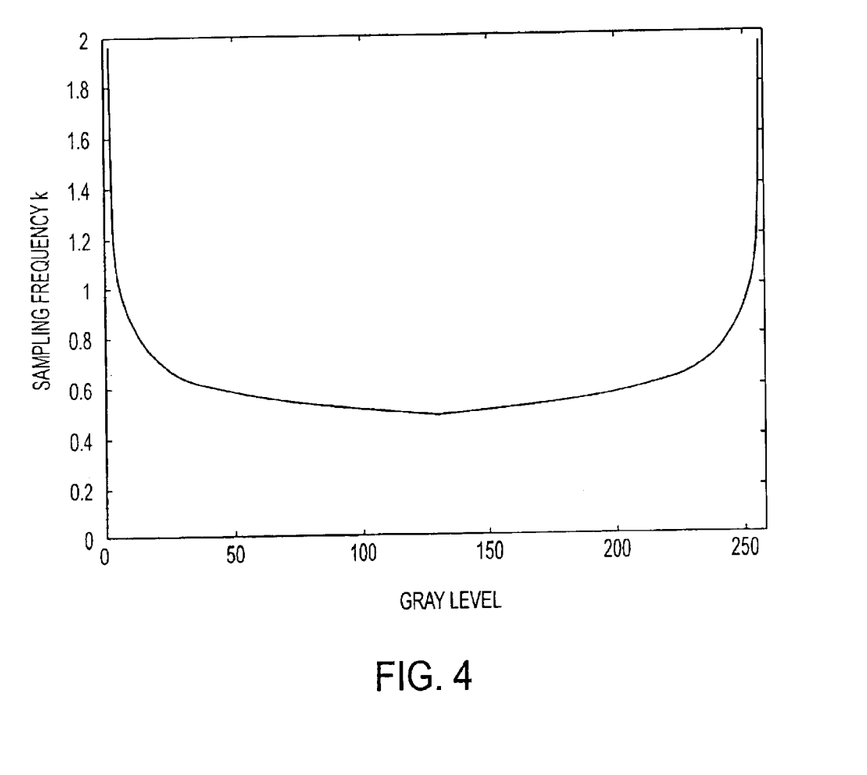
FIG. 4 is graph of sampling frequency versus gray level.

Referring to FIG. 2, a Color Smooth dither matrix design process is described. First, an intermediate CMYK pattern is designed. Next, all the lighter patterns are designed by gradually removing dots, moving from the current point represented by the intermediate pattern along the neutral axis to white. Thereafter, all the darker patterns are designed by gradually adding dots, moving from the current point to black along the neutral axis. This approach ensures that the stacking property of the dither matrix is satisfied (i.e., all dots in a lighter pattern must also be present in a darker pattern.)

Color Representation

To generate the intermediate pattern, with a random pattern with a given amount of cyan, magenta, yellow, and black dots. At each position, the pixel may take on any valid color. A binary printing situation is described herein where a valid color is composed of at most one dot of each color.

For CMYK printing without maximum amount of ink resitrictions, there are sixteen valid colors: c(cyan), m(magenta), y(yellow), k(black), w(white), cm(blue), cy(green), my(red), ck, mk, yk, cmy, cmk, cyk, myk, and cmyk. For convenience, c(m,n) can be utilized to represent the color of the pixel at position (m,n). Suppose the dither matrices being designed are M×N, then $0 \leq m < M$, and $0 \leq n < N$. c(m,n) is a four-bit number with each bit from left to right corresponding to cyan, magenta, yellow, and black respecitvely. When one of the primary colors is present at (m,n), the corresponding bit in c(m,n) is set to 1. Otherwise, it is set to 0. For example, if the color of the pixel is cm(blue), then c(m,n)=1100.

Figure 10:
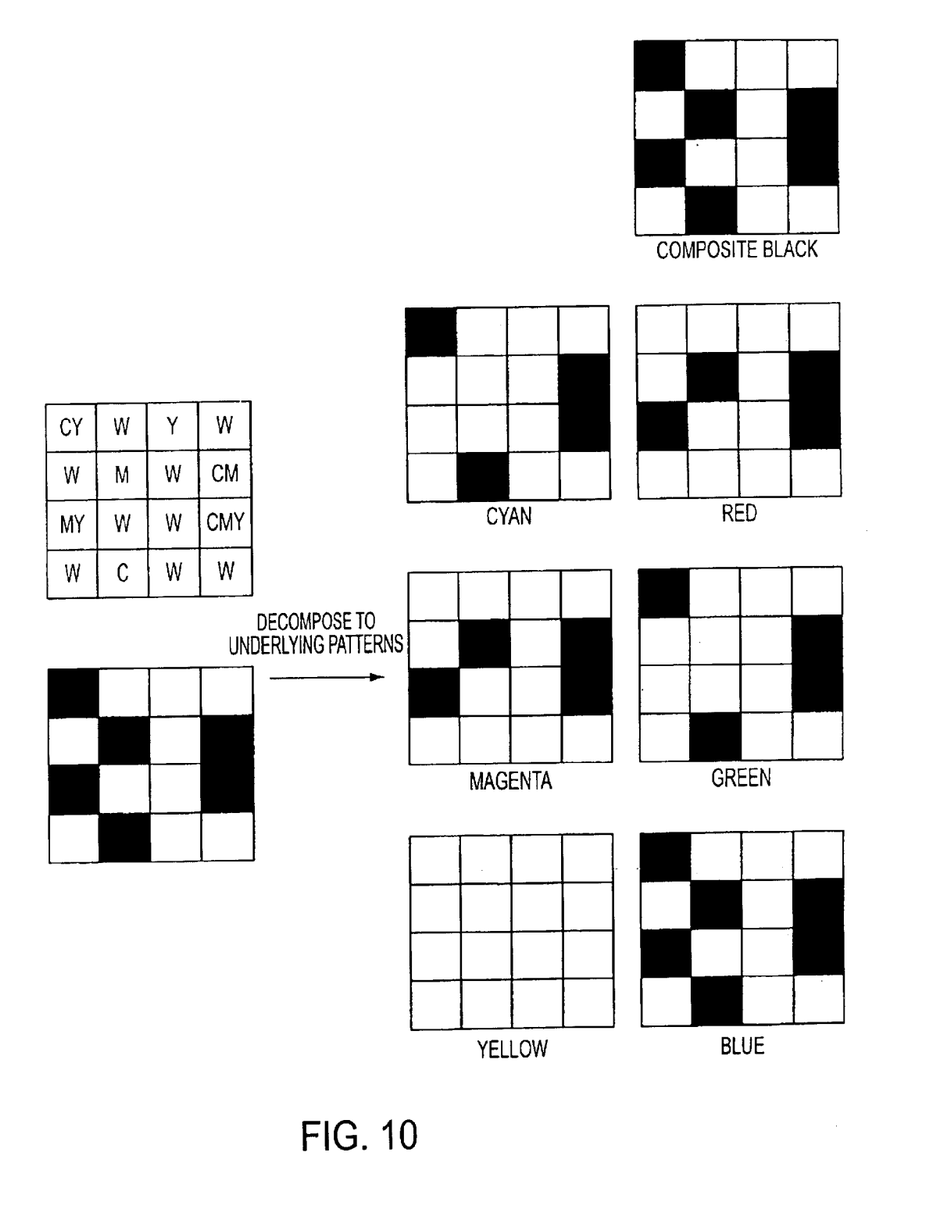
FIG. 10 is a representation of the decomposition of an initial pattern into underlying patterns.

The intermediate CMYK pattern that is being designed also influences all underlying patterns (i.e., all patterns of a primary color (either cyan, or magenta, or yellow, or black), secondary color (any combination of two colors from cyan, magenta, yellow, and black), and tertiary color (any combination of three colors from cyan, magenta, yellow, and black). The decomposition into underlying colors is illustrated in FIG. 10 for the simple case of 25% cyan, magenta, and yellow each, with no black. All these patterns or a subset of them can be taken into account when computing the color pattern fluctuation metric.

The i-th decomposition pattern can be represented by $f_i(m,n)$. Let the maximum number of underlying colors in the decomposition be $N_c$, then $0 \leq i < N_c$. For a CMYK pattern, $N_c$ is sixteen.

The i-th decomposition $f_i(m,n)$ is the result of a bitwise AND operation of $c(m,n)$ with i-th color: $f_i(m,n)=c(m,n)\&i$. For example, the 4-th decomposition is $f_i(m,n)=c(m,n)\&0100$. So when there is a magenta dot at $(m,n)$ in the i-th decomposition pattern, then $f_i(m,n)=0100$. Otherwise, $f_i(m,n)=0000$.

In order to improve image quality, it is preferable to constrain the set of valid colors, as described hereinabove, to those permissible colors that can be utilized at a given halftone gray level in the design process. For example, in highlight areas, the occurrence of all secondary and tertiary colors and composite black or black (K) may be prohibited so as to prevent overlap of colorant dots and to minimize texture contrast. In this case, the only colors that would be permitted would be 0000, 1000, 0100, and 0010. At any halftone gray level, this set of colors that can be utilized is referred to as permissible colors.

COLOR FLUCTUATION FUNCTION

As described above, the initial random pattern is refined by minimizing a fluctuation function or metric. The steps for computing the fluctuation metric in accordance to one embodiment of the present invention are now described.

First, the color patterns are converted from a colorant space (e.g., CMYK space) into a uniform color space, such as the L*a*b space, since the uniform color space represents how the human visual system responds to color more accurately than the colorant space. The conversion may be accomplished by measuring the L*a*b values of all sixteen valid colors described above. The L*a*b values of $f_i(m,n)$ may be represented by the following pixel maps: $fL_i(m,n)$ $fa_i(m,n)$ and $fb_i(m,n)$.

The variances of the resulting L*a*b pixel maps are computed. These variances represent the amount of fluctuation in each underlying pattern. Let the variances be represented by $\sigma^2_{gL\_i}$, $\sigma^2_{ga\_i}$, and $\sigma^2_{gb\_i}$, Then, the color fluctuation in the i-th decomposition pattern can be computed according to the following expression:

$$\sigma^2_{g\_i} = \alpha\sigma^2_{gL\_i} + \sigma^2_{ga\_i} + \sigma^2_{gb\_i}$$

where $\alpha$ is the weighting factor that emphasizes the importance of luminance in human visual perception. In this embodiment, $\alpha$ is chosen to be four.

The fluctuation metric (also referred to herein as the cost function associated with the human visual system) may be expressed as the weighted sum of the variances.

$$C_{HVS} = \sum_{i=0}^{N_c-1} \omega_i \sigma^2_{g_i}$$

$\omega_i$ is the weighting factor of the i-th decomposition pattern and may range from 0 to 1. It is preferable to choose a larger weighting factor for a decomposition pattern corresponding to a more important color or a color that is more difficult to control. One example is to choose $\omega_i$ to be 1 for the secondary colors (red, blue, and green) and composite black (CMY), and to choose $\omega_i$ to be 0 for the remainder of the colors.

MINIMIZATION OF THE COLOR FLUCTUATION FUNCTION

Figure 5:
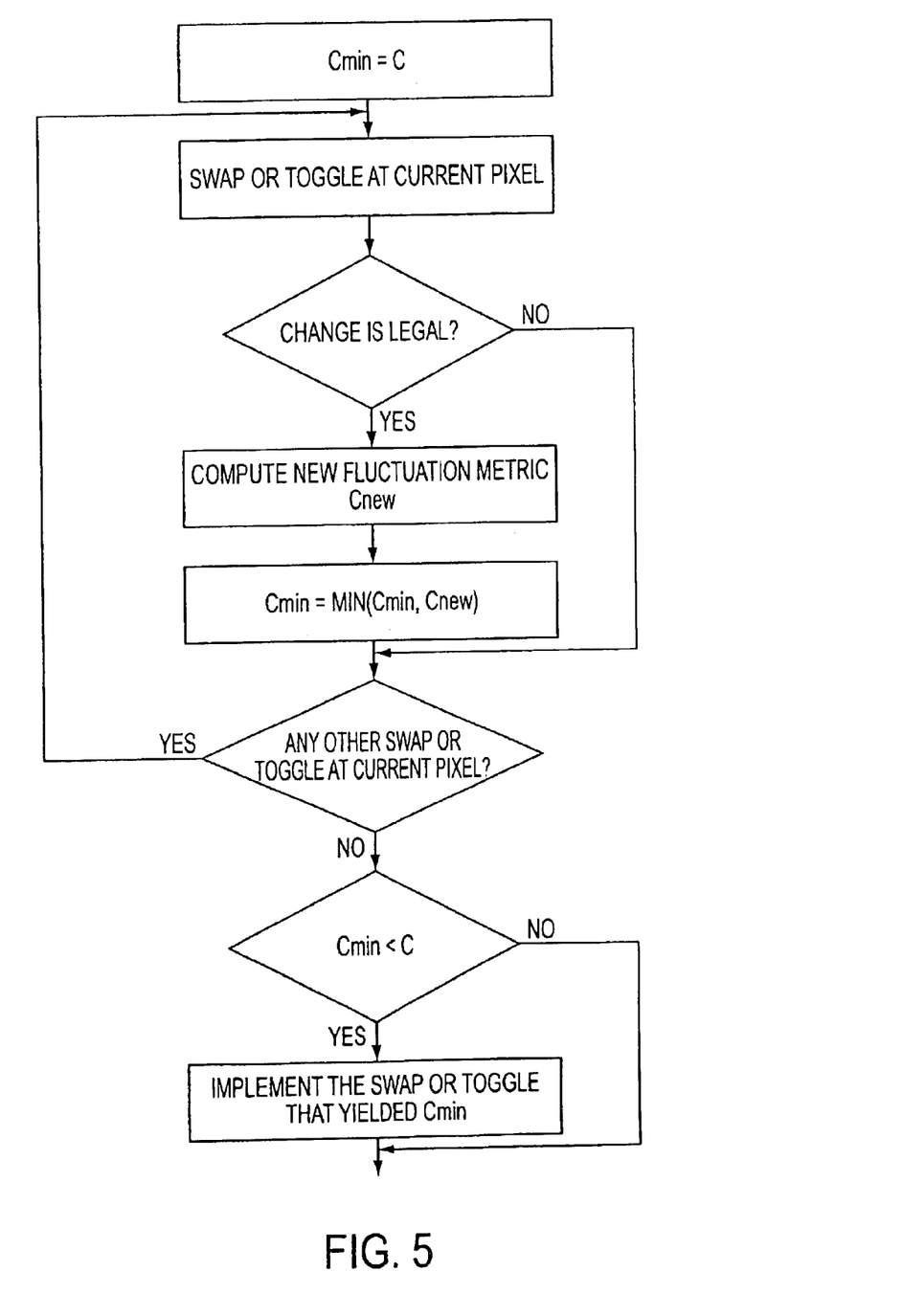
FIG. 5 is a flow chart showing in greater detail the toggling operation and the swapping operation.

The present invention minimizes the color fluctuation function (also referred to herein as the color fluctuation metric) by the process described herein. Referring to FIG. 5, the pixel map is scanned one pixel at a time. At each pixel, swap and toggle operations are performed, and the fluctuation metric is re-computed. The swap operation exchanges one primary color or white at the current pixel with another primary color or white at a neighboring pixel. It is important that the colors at both pixels after swapping remain one of the valid colors. Additionally, it is important that the colors at both pixels after swapping remain one of the permissible colors at the gray level of the halftone pattern. The toggle operation switches from the existing color at a pixel to any other valid color.

The operation that results in the largest reduction in the fluctuation metric is selected and applied to the pattern, and the new pattern generated by this operation is stored. If all operations result in an increase in the fluctuation metric, then the previous pattern before the operations is restored. This process is continued until no operation is retained after a complete scan of the pixel map. The resulting color pattern is the intermediate pattern.

After the intermediate pattern is designed, the patterns that are lighter and darker than the intermediate pattern are designed. For a pattern that is lighter than the intermediate pattern, a given number of cyan, magenta, and yellow dots are deleted randomly from the intermediate pattern. This number can be determined with a calibration procedure, such as the calibration procedure that is described in U.S. Pat. No. 5,689,586, entitled, "Methods to Print N-tone Images With Multi-leveling Techniques" by Qian Lin.

The pattern with fewer cyan, magenta, and yellow dots is then refined by utilizing a procedure that is analogous to the process described above in the design of the intermediate pattern. It is important that only the positions of the newly deleted dots are allowed to be toggled or swapped so that the stacking property of dither matrix patterns is satisfied. The fluctuation metric is again minimized using the swap and toggle operations. However, the toggle and swap operations are subject to the stacking constraint in addition to the set of valid and permissible colors. It is important that if there is a need to keep the exact dot number in the refined pattern, then toggling may be disabled.

A similar process is performed to generated darker patterns except that instead of deleting dots, dots are added to the previously designed pattern.

The final dither matrices for each primary color is obtained by summing the binary patterns of the primary color for all gray levels.

TOTAL COLOR COST FUNCTION

One aspect of the present invention is generating dither matrices by using a total cost function that incorporates a modified human visual system model cost function and a term that encourages clustering (e.g., a cluster cost function).

MODIFICATION OF THE HVSM COST FUNCTION

The HVSM cost function is modified so that the cluster sizes are uniform for the different primary colors. One manner to ensure uniform cluster sizes for the different primary colors is to make the HVSM cost function color blind. For example, in CMY dither matrix design, $fL_i(m,n)$ is replaced by $fL_{prim}(m,n)$ for i=1,2,4, and by $fL_{secn}(m,n)$ for i=3,5,6 where $fL_{prim}(m,n)$ is the average of $fL_i(m,n)$ for i=1,2,4, and $fL_{secn}(m,n)$ is the average of for i=3,5,6.

INCORPORATION OF A CLUSTER COST FUNCTION

Let $h_c(m,n)$ be a clustering filter that includes a positive peak followed by a negative skirt. The clustering filter encourages clustering to compact structures and not elongated. structures. The present invention applies the clustering filter to the halftone pattern and then maximizes its response. A first exemplary clustering filter than can be utilized for this purpose may be expressed as follows:

$$h_c(m,n)=e^{-(m^2+n^2)/(2\sigma^2)}-0.5^{-(m^2+n)/(4\sigma^2)}$$

where m and n are pixel positions, and where $\sigma$ is a parameter for controlling the size of the cluster. Preferably, the $\sigma$ parameter is chosen between 0.75 and 1.5. In addition, the cluster size parameter cy is preferably made dependent on the gray-level and may be implemented as a look-up table that specifies a cluster size for each gray-level. The look-up table allows the cluster size to vary across tonal ranges, thereby providing flexibility to the total cost function.

Figure 6:
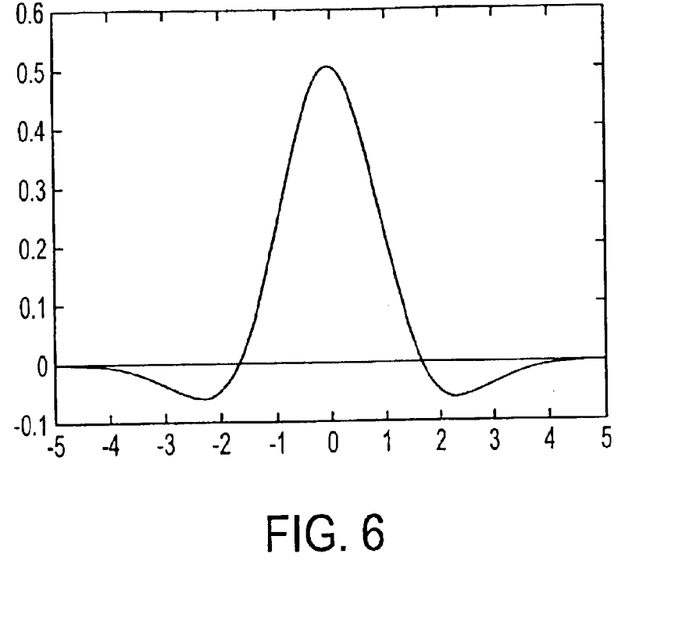
FIG. 6 illustrates a cross section of the point spread function of one type of clustering filter according to one embodiment of the present invention.

FIG. 6 illustrates a cross section of the point-spread function of the first exemplary clustering filter. The cross section of the point spread function of the first exemplary clustering filter includes a central lobe 604 that encourages clustering of a certain size related the size of the central lobe and negative side lobes 608 for inhibiting the extension of clusters across the side lobes. Accordingly, the resulting clusters are compact and not elongated since if the cluster extends across the negative side lobe, then a negative contribution results, thereby reducing the response of the filter.

The cluster cost function $C_{clus}$ for a color halftone pattern c(m,n) is defined as the variance of the filtered image $g_c(m,n)$, where $$g_c(m,n)=c(m,n)** h_c(m,n).$$

The cluster cost function $C_{clus}$ can be expressed as follows as the variance of $g_c$:

$$C_{clus}=\sigma_{gc}.$$

The total cost function of a halftone pattern can be expressed as follows:

$$C_{total}=\lambda C_{HVS}-(1-\lambda)C_{clus}$$

where $\lambda$ is the cluster factor for controlling the clustering effect in the halftone pattern. The clustering effect can be defined as the size of the clusters in the halftone pattern (e.g., the number of dots clumped together to form each cluster). It is noted that $\lambda$ can vary between 0 and 1. When $\lambda$ is equal to one, a dispersed-dot smooth dither halftone is obtained. When $\lambda$ is equal to zero, only a clustering effect is present, which may not result in a uniform halftone pattern. Through empirical tests, the inventors have determined that a preferable value for $\lambda$ is around 0.2.

The present invention selects textures that result in a large $C_{clus}$ term, which is then subtracted from the $\lambda C_{HVS}$ term, in order to minimize $C_{total}$. Preferably, the cluster factor $\lambda$ is made dependent on the gray-level and may be implemented as a look-up table that specifies a cluster factor for each gray-level. The look-up table allows the cluster factor to vary across tonal ranges, thereby providing flexibility to the total cost function.

A second exemplary clustering filter than can be utilized for this purpose may be expressed as follows:

$$h_c(m,n)=e^{-(m^2+n^2)/(2\sigma^2)}-0.5e^{-(m^2+n)/(4\sigma^2)}(1+\beta\cos(4\theta))/2)$$

where m and n are pixel positions, where a is a parameter for controlling the size of the cluster, where $\beta$ is a parameter for controlling the symmetry of the cluster cost function, and where $\theta=\mathrm{atan}(n/m)$.

Figure 7:
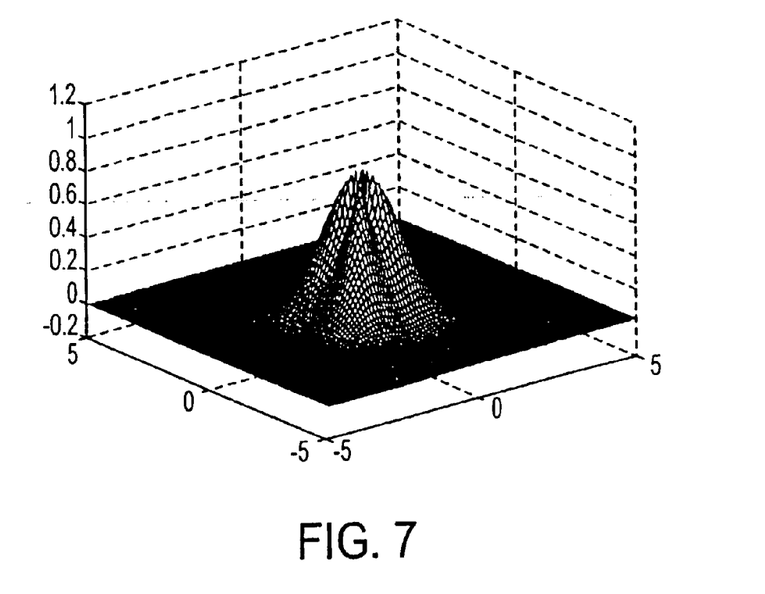
FIG. 7 illustrates a point-spread function of a second type of clustering filter according to a second embodiment of the present invention.

This clustering filter has the advantage that when the filter is applied, the vertical and horizontal patterns in the midtone regions are removed. With a suppression term, such as the cosine term, the negative sidelobes are located on the horizontal and vertical axes, thereby suppressing the formation of long horizontal structures or long vertical structures. A symmetry factor $\beta$ controls the amount of deviation form the circularly symmetric filter. Preferably, the symmetry factor $\beta$ is gray-level dependent. FIG. 7 illustrates a point spread function of the clustering filter for $\beta=0.5$ Although a four dimensional CMYK color space has been described, other color spaces that have fewer than four dimensions or that have more than four dimensions, may be used. For example, the present invention can be applied to a three-dimensional RGB color space or a CMY color space. In addition, although preferably the color pattern has a plurality of colors, the present invention can be used to generate a dither matrix for a single color. The scope of the invention should be determined with reference to the appended claims, along with the full scope of equivalents to which such claims are entitled.

Figure 8A:
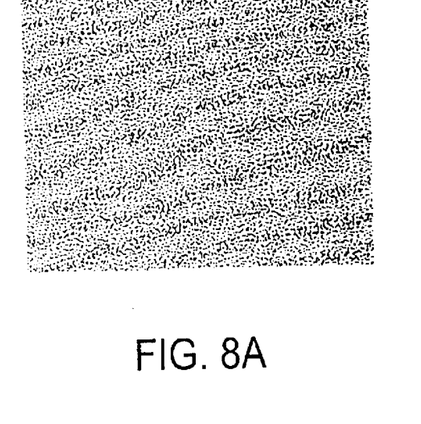
FIG. 8A illustrates a halftone pattern at 10% of cyan, magenta, and yellow each using non-clustered dither matrices.
Figure 8B:
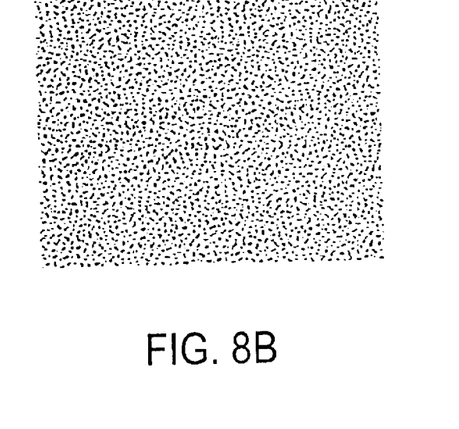
FIG. 8B illustrates a halftone pattern at 10% of cyan, magenta, and yellow each using dither matrices designed by the design process of the present invention.

FIG. 8A illustrates a halftone pattern at 10% of cyan, magenta, and yellow each using non-clustered dither matrices. FIG. 8B illustrates a halftone pattern at 10% of cyan, magenta, and yellow each using dither matrices designed by the design process of the present invention.

Figure 9A:
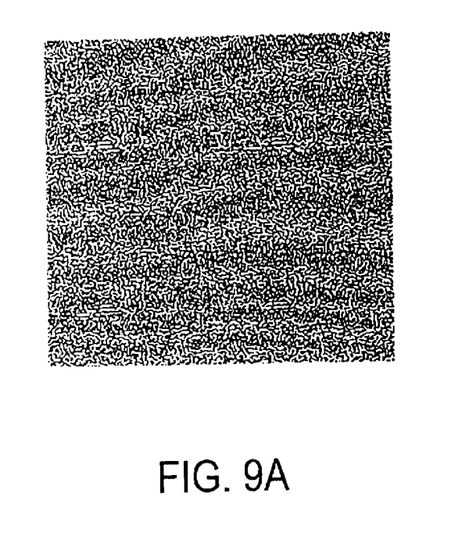
FIG. 9A illustrates a halftone pattern at 25% of cyan, magenta, and yellow each using non-clustered dither matrices.
Figure 9B:
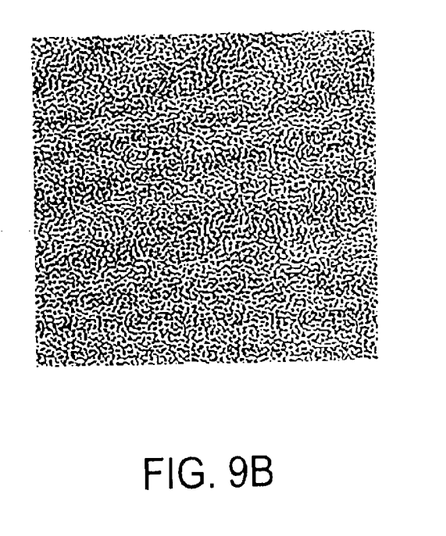
FIG. 9B illustrates a halftone pattern at 25% of cyan, magenta, and yellow each using dither matrices designed by the design process of the present invention.

FIG. 9A illustrates a halftone pattern at 25% of cyan, magenta, and yellow each using non-clustered dither matrices. FIG. 9B illustrates a halftone pattern at 25% of cyan, magenta, and yellow each using dither matrices designed by the design process of the present invention.

As these examples illustrate, the use of a cluster filter in generating stochastic screens has the advantage that the screens are moiré and pattern free and are also less likely to show bands. These features are important especially when using printing engines that have dot-to-dot interaction, such as laser printers. In addition, the stochastic screen design method and system of the present invention generates clustered dot halftone patterns that provide better tone reproduction characteristics, less dot gain, and more stable dots in printing engines with dot-to-dot interaction.

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for generating dither matrices for use in halftone printing comprising:

receiving a human visual system model cost function;

modifying the human visual system model cost function to be color-blind;

adding a cluster cost function to the human visual system model cost function to generate a total cost function, the total cost function having a clustering factor for specifying the amount of clustering effect in the halftone image; and employing the total cost function to generate dither matrices.

2. The method of claim 1 wherein the clustering factor is gray-level dependent.

3. The method of claim 2 wherein the gray-level dependent clustering factor is implemented with a look-up table that specifies a clustering factor for each gray level.

4. The method of claim 1 wherein the cluster cost function includes a structure suppression term for suppressing the formation of long horizontal structures or long vertical structures in the halftone image.

5. The method of claim 4 wherein the structure suppression term includes a symmetry factor for controlling the amount of deviation from a circularly symmetric filter for the cluster cost function.

6. The method of claim 5 wherein symmetry factor is gray-level dependent.

7. The method of claim 6 wherein the gray-level dependent symmetry factor is implemented with a look-up table that specifies a clustering factor for each gray level.

8. The method of claim 1 wherein the cluster cost function is represented by the following expression:

$$h_c(m,n) = e^{-(x^2+y^2)/(2\sigma^2)} - 0.5 e^{-(x^2+y^2)/(4\sigma^2)}$$

where m and n are pixel positions, where s is a parameter for controlling the size of the cluster.

9. The method of claim 1 wherein the cluster cost function is represented by the following expression:

$$h_c(m,n) = e^{-(m^2+n^2)/(2\sigma^2)} - 0.5 e^{-(m^2+n^2)/(4\sigma^2)}(1+\beta\cos(4\theta))/2$$

where m and n are pixel positions, where s is a parameter for controlling the size of the cluster, where $\beta$ is a parameter for controlling the symmetry of the cluster cost function, and where $\theta = \operatorname{atan}(n/m)$.

10. The method of claim 1 wherein the total cost function is represented by the following expression:

$$C_{total} = \lambda C_{HVS} - (1-\lambda) C_{clus}$$

where $\lambda$ is the cluster factor for specifying the dispersion distance between dots in a halftone pattern.

11. The method of claim 10 wherein the cluster is in the range of 0.1 and 0.4.

12. The method of claim 1 wherein employing the total cost function to generate dither matrices comprises:

generating an initial random pattern for a predetermined gray level, the pattern having a plurality of pixels;

for each pixel in the pattern computing a fluctuation function that includes a clustering term;

at each pixel performing swap and toggle operations on the pixel map to generate a modified pixel map, and re-computing the fluctuation function based on the modified pixel map;

comparing the re-computed fluctuation measure with the fluctuation measure prior to the swap and toggle operations;

replacing current pixel map with the modified pixel map that results in the largest reduction in the fluctuation measure; and if all operations increase the fluctuation measure, then restoring the pixel map prior to the swap and toggle operations.

13. The method of claim 1 wherein employing the total cost function to generate dither matrices includes employing the total cost function to generate a dither matrix for the cyan color channel;

employing the total cost function to generate a dither matrix for the magenta color channel;

employing the total cost function to generate a dither matrix for the yellow color channel; and employing the total cost function to generate a dither matrix for the black color channel.

14. The method of claim 1 wherein modifying the human visual system model cost function to be color-blind includes replacing $fL_i(m,n)$ by $fL_{prim}(m,n)$ for i=1,2,4, and by $fL_{secn}(m,n)$ for i=3,5,6 where $fL_{prim}(m,n)$ is the average of $fL_i(m,n)$ for i=1, 2,4, and $fL_{secn}(m,n)$ is the average of for i=3,5,6.

15. A method of generating a halftone image from a gray scale image by using a dither matrix, the halftone image and the gray scale image each having a plurality of pixels, each pixel having a value, the dither matrix including a plurality of patterns, each pattern corresponding to a specific gray-level, and each pattern having a plurality of elements, each element having a value, the dither matrix having a plurality of threshold values, wherein each threshold value is the sum of all corresponding element values of all the patterns, the method comprising the steps of:

comparing the value of each pixel of the gray scale image with the value of an element in the dither matrix and;

based on the result of the comparison, determining the value of a corresponding pixel of the halftone image; and the value of each element in each pattern of the dither matrix being determined by a clustering filter, wherein the clustering filter is represented by the following expression:

$$h_c(m,n) = e^{-(x^2+y^2)/(2\sigma^2)} - 0.5 e^{-(x^2+y^2)/(4\sigma^2)}$$

where m and n are pixel positions, and where s is a parameter for controlling the size of the cluster.

16. A system for generating dither matrices for use in halftone printing comprising:

(a) a human visual system model unit for providing a human visual system model cost function;

(b) a human visual system model modification module, coupled to the human visual system model unit, for generating a human visual system model cost function that is color-blind based on the human visual system model;

(c) a cluster cost function module, coupled to the human visual system model modification module, for generating a total cost function that includes a clustering cost function; and (d) a dither matrix generation module, coupled to the cluster cost function module, for generating dither matrices based on the total cost function.

17. The system of claim 16 wherein the clustering cost function is gray-level dependent and implemented by using a look-up table that specifies a clustering factor for each specific gray level.

18. The system of claim 16 wherein the clustering cost function includes a structure suppression term for suppressing the formation of long horizontal structures or long vertical structures.

19. The system of claim 18 wherein the structure suppression term includes a symmetry factor for specifying the symmetry of the cluster cost function.

20. The system of claim 19 wherein the symmetry factor is gray-level dependent and implemented by using a look-up table that specifies a symmetry factor for each specific gray level.

21. A computer readable storage medium on which is embedded one or more computer programs, said one or more computer programs implementing a method for generating dither matrices for use in halftone printing, said one or more computer programs comprising a set of instructions for:

receiving a human visual system model cost function;

modifying the human visual system model cost function to be color-blind;

adding a cluster cost function to the human visual system model cost function to generate a total cost function, the total cost function having a clustering factor for specifying the amount of clustering effect in the halftone image; and employing the total cost function to generate dither matrices.

22. The computer readable storage medium according to claim 21, said one or more computer programs further comprising a set of instructions for:

generating an initial random pattern for a predetermined gray level, the pattern having a plurality of pixels;

for each pixel in the pattern computing a fluctuation function that includes a clustering term;

at each pixel performing swap and toggle operations on the pixel map to generate a modified pixel map, and re-computing the fluctuation function based on the modified pixel map;

comparing the re-computed fluctuation measure with the fluctuation measure prior to the swap and toggle operations;

replacing current pixel map with the modified pixel map that results in the largest reduction in the fluctuation measure; and if all operations increase the fluctuation measure, then restoring the pixel map prior to the swap and toggle operations.

23. The computer readable storage medium according to claim 21, wherein employing the total cost function to generate dither matrices includes employing the total cost function to generate a dither matrix for the cyan color channel; said one or more computer programs further comprising a set of instructions for:

employing the total cost function to generate a dither matrix for the magenta color channel;

employing the total cost function to generate a dither matrix for the yellow color channel; and employing the total cost function to generate a dither matrix for the black color channel.

* * * * *